United States Patent
Yi et al.

(10) Patent No.: US 8,953,136 B2
(45) Date of Patent: Feb. 10, 2015

(54) COLOR FILTER SUBSTRATE, LIQUID CRYSTAL DISPLAY DEVICE INCLUDING COLOR FILTER SUBSTRATE, AND METHOD OF FABRICATING COLOR FILTER SUBSTRATE

(71) Applicant: Samsung Display Co., Ltd., Yongin, Gyeonggi-Do (KR)

(72) Inventors: Young-Dae Yi, Yongin (KR); Dong-Gyu Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 123 days.

(21) Appl. No.: 13/680,686

(22) Filed: Nov. 19, 2012

(65) Prior Publication Data

US 2014/0036189 A1    Feb. 6, 2014

(30) Foreign Application Priority Data

Aug. 1, 2012   (KR) ................ 10-2012-0084589

(51) Int. Cl.
| | | |
|---|---|---|
| G02F 1/1333 | (2006.01) | |
| G02F 1/1335 | (2006.01) | |
| G02B 5/20 | (2006.01) | |
| G02F 1/1339 | (2006.01) | |

(52) U.S. Cl.
CPC .......... *G02F 1/133512* (2013.01); *G02B 5/201* (2013.01); *G02F 1/13394* (2013.01)
USPC ............ 349/155; 349/110; 349/106; 359/891

(58) Field of Classification Search
CPC .................. G02F 1/133512; G02F 1/133514; G02B 5/201

USPC .......................................... 349/155, 110, 106
See application file for complete search history.

(56) References Cited

U.S. PATENT DOCUMENTS

| | | | | |
|---|---|---|---|---|
| 7,528,411 | B2 * | 5/2009 | Jang ................................ | 257/72 |
| 7,609,357 | B2 * | 10/2009 | Kim .............................. | 349/156 |
| 7,847,891 | B2 | 12/2010 | Kim et al. | |
| 7,948,599 | B1 * | 5/2011 | Ryu .............................. | 349/155 |
| 2002/0075443 | A1 | 6/2002 | Shimizu et al. | |
| 2005/0095514 | A1 | 5/2005 | Lee et al. | |
| 2005/0253994 | A1 * | 11/2005 | Kamijima et al. ............ | 349/155 |
| 2007/0002260 | A1 | 1/2007 | Choi | |
| 2007/0002263 | A1 * | 1/2007 | Kim et al. ..................... | 349/156 |

(Continued)

FOREIGN PATENT DOCUMENTS

| | | |
|---|---|---|
| JP | 3680730 | 5/2005 |
| KR | 10-2011-0024597 | 3/2011 |
| KR | 10-1082906 | 11/2011 |

*Primary Examiner* — Edward Glick
*Assistant Examiner* — Sang V Nguyen
(74) *Attorney, Agent, or Firm* — Robert E. Bushnell, Esq.

(57) ABSTRACT

In a color filter substrate and a liquid crystal display device including the same, the color filter substrate includes: a first black matrix not having an opening; a second black matrix having an opening; the first black matrix and the second black matrix being formed on a substrate; an auxiliary pattern disposed in the opening; a color filter covering the first and second black matrixes and formed in each of a plurality of pixels; an overcoat layer formed on the color filter; a first column spacer formed on the overcoat layer so as to correspond to the first black matrix; and a second column spacer formed above the auxiliary pattern so as to correspond to the second black matrix.

20 Claims, 8 Drawing Sheets

(56) References Cited

U.S. PATENT DOCUMENTS

| | | | |
|---|---|---|---|
| 2007/0058125 A1* | 3/2007 | Yoo et al. | 349/152 |
| 2008/0088788 A1* | 4/2008 | Cho et al. | 349/160 |
| 2009/0015780 A1* | 1/2009 | Choi et al. | 349/156 |
| 2009/0279013 A1* | 11/2009 | Kang et al. | 349/48 |
| 2011/0299002 A1* | 12/2011 | Won et al. | 349/43 |
| 2012/0120337 A1* | 5/2012 | Ji et al. | 349/39 |

* cited by examiner

COLOR FILTER SUBSTRATE, LIQUID CRYSTAL DISPLAY DEVICE INCLUDING COLOR FILTER SUBSTRATE, AND METHOD OF FABRICATING COLOR FILTER SUBSTRATE

CLAIM OF PRIORITY

This application makes reference to, incorporates the same herein, and claims all benefits accruing under 35 U.S.C. §119 from an application earlier filed in the Korean Intellectual Property Office on the 1 day of Aug. 2012 and there duly assigned Serial No. 10-2012-0084589.

BACKGROUND OF THE INVENTION

1. Field of the Invention

The present invention relates to a color filter substrate, a liquid crystal display device including the color filter substrate, and a method of fabricating the color filter substrate.

2. Description of the Related Art

Flat panel displays are image display devices, such as a liquid crystal display device, an organic light-emitting display device, and an electrophoretic display device. In particular, the liquid crystal display device is most widely used. The liquid crystal display device includes two substrates, each having an electrode formed thereon, and a liquid crystal layer interposed between the two substrates. In the liquid crystal display device, a voltage is applied across the electrodes formed on the respective substrates to rearrange liquid crystal molecules of the liquid crystal layer, and thus an amount of light passing through the liquid crystal layer is adjusted.

Upper and lower substrates of the liquid crystal display device are coupled to each other by a sealing material that is formed along the edges of the upper and lower substrates to trap liquid crystals. The upper and lower substrates are supported by a plurality of column spacers formed in a predetermined pattern between the upper and lower substrates to maintain a predetermined cell gap therebetween.

In the case that heights of the plurality of column spacers for maintaining the predetermined cell gap between the upper and lower substrates are equal, when the liquid crystal display device is exposed in a high-temperature environment, the liquid crystal layer expands, thereby deteriorating reliability of maintenance of the cell gap.

SUMMARY OF THE INVENTION

The present invention provides a liquid crystal display device including double column spacers, that is, a main column spacer and a sub-column spacer having respectively different heights.

The present invention also provides a method of forming a double column spacer by using a single column spacer mask.

According to an aspect of the present invention, there is provided a color filter substrate including: a first black matrix not having an opening and a second black matrix having an opening, wherein the first black matrix and the second black matrix are formed on a substrate; an auxiliary pattern disposed in the opening; a color filter covering the first and second black matrixes and formed in each of pixels; an overcoat layer formed on the color filter; a first column spacer formed on the overcoat layer so as to correspond to the first black matrix; and a second column spacer formed above the auxiliary pattern so as to correspond to the second black matrix.

The auxiliary pattern is a part of the color filter.

The color filter for forming the auxiliary pattern is a blue color filter.

Heights of the first and second black matrixes are greater than a height of the auxiliary pattern.

The heights of the first and second black matrixes are less than a height of the auxiliary pattern.

The first column spacer and the second column spacer have the same height, and a step height is formed between the first column spacer and the second column spacer.

The color filter substrate may further include a common electrode formed on the overcoat layer.

According to another aspect of the present invention, there is provided a liquid crystal display device, including: a first substrate; a first black matrix formed on the first substrate and not having an opening; a second black matrix formed on the first substrate and having an opening; an auxiliary pattern disposed in the opening; a color filter covering the first and second black matrixes and formed in each of a plurality of pixels; an overcoat layer formed on the color filter; a first column spacer formed on the overcoat layer so as to correspond to the first black matrix; a second column spacer formed above the auxiliary pattern so as to correspond to the second black matrix; a second substrate; a thin film transistor (TFT) formed in a light blocking region on the second substrate; and a pixel electrode electrically connected to the TFT.

The auxiliary pattern may be a part of the color filter.

The color filter for forming the auxiliary pattern may be a blue color filter.

Heights of the first and second black matrixes may be greater than a height of the auxiliary pattern.

The heights of the first and second black matrixes may be less than a height of the auxiliary pattern.

The first column spacer and the second column spacer may have the same height, and a step height may be formed between the first column spacer and the second column spacer.

The first substrate may further include a common electrode formed on the overcoat layer.

According to another aspect of the present invention, there is provided a method of manufacturing a color filter substrate, the method including: forming a first black matrix not having an opening and a second black matrix having an opening; forming a color filter on the first black matrix and the second black matrix; disposing an auxiliary pattern in the opening; forming an overcoat layer on the color filter and the auxiliary pattern; forming a first column spacer in a region where the first black matrix is formed on the overcoat layer; and forming a second column spacer in a region where the second black matrix is formed on the overcoat layer.

The auxiliary pattern may be formed as a part of the color filter.

The color filter for forming the auxiliary pattern may be a blue color filter.

Heights of the first and second black matrixes may be greater than a height of the auxiliary pattern.

The heights of the first and second black matrixes may be less than a height of the auxiliary pattern.

The method may further include forming a common electrode on the overcoat layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Various changes in form and detail may be made to the present inventive concept, and thus the invention should not be construed as being limited to the embodiments set forth herein. The inventive concept is not limited to the embodiments described in the present description, and thus it should be understood that the inventive concept does not include every kind of variation example or alternative equivalent included in the spirit and scope of the inventive concept. Also, while describing the embodiments, detailed descriptions about related well-known functions or configurations that may diminish the clarity of the points of the embodiments of the present invention will be omitted.

In the present description, terms such as 'first', 'second', etc. are used to describe various elements. However, it is obvious that the elements should not be defined by these terms. The terms are used only for distinguishing one element from another.

It will also be understood that, when a layer is referred to as being "on" another layer or substrate, it can be directly on the other layer or substrate, or intervening elements may also be present.

The present invention will now be described more fully with reference to the accompanying drawings, in which exemplary embodiments of the invention are shown.

Figure 1:
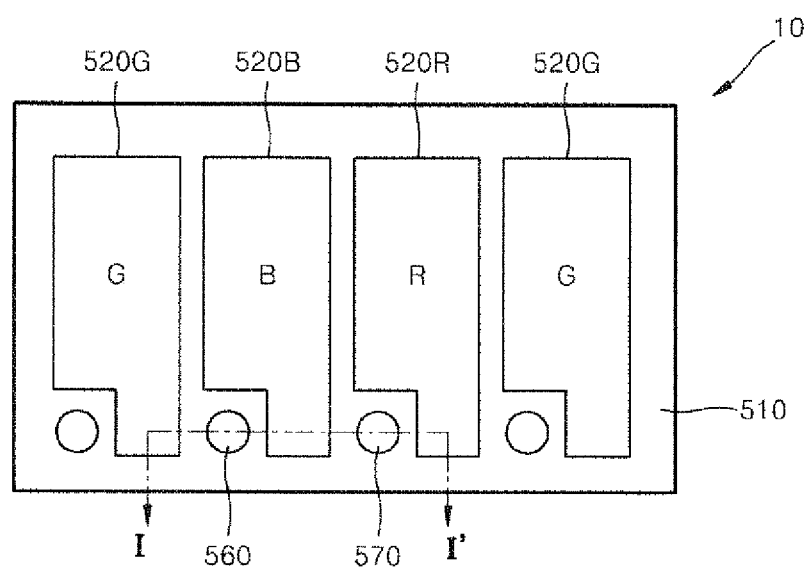
FIG. 1 is a schematic plan view of a liquid crystal display device according to an embodiment of the present invention.
Figure 2:
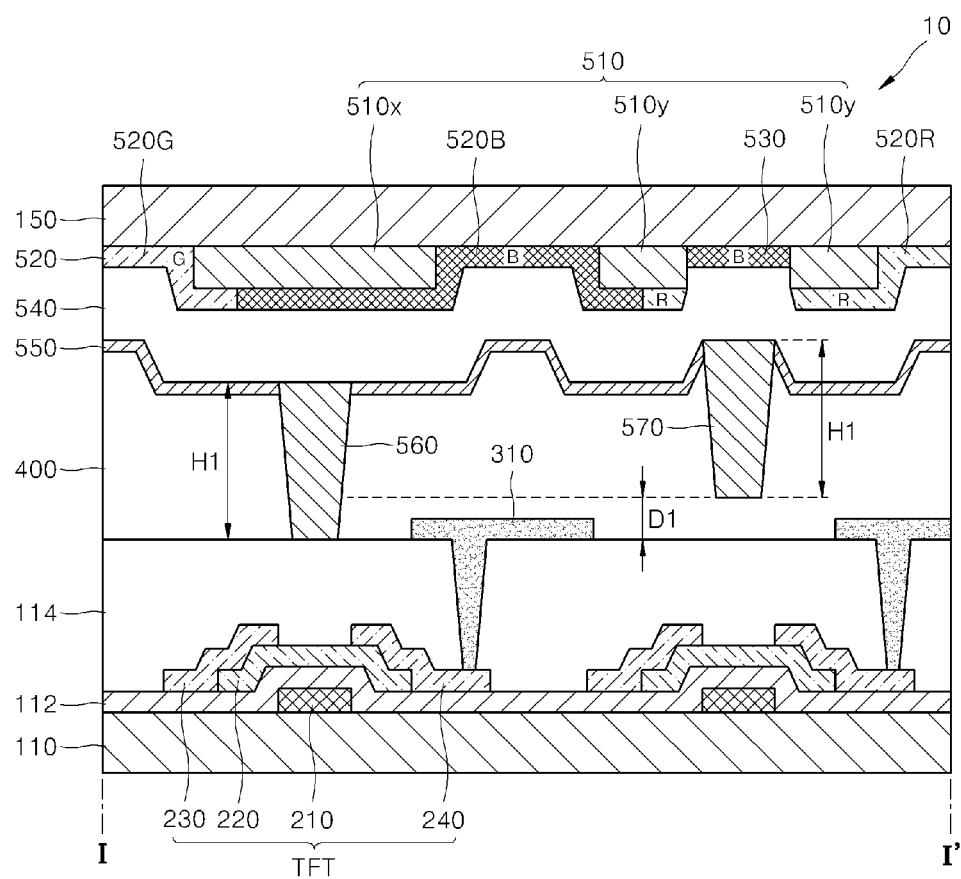
FIG. 2 is a cross-sectional view taken along line I-I' of FIG. 1.

FIG. 1 is a schematic plan view of a liquid crystal display device according to an embodiment of the present invention, and FIG. 2 is a cross-sectional view taken along line I-I' of FIG. 1.

Referring to FIGS. 1 and 2, the liquid crystal display device 10 has a structure in which an array substrate 110 and a color filter substrate 150 are attached to each other. A liquid crystal material is injected between the array substrate 110 and the color filter substrate 150. A structure including the color filter substrate 150, the array substrate 110, and a liquid crystal layer 400 is referred to as a liquid crystal panel.

The array substrate 110 includes a plurality of pixels formed at crossing points of a plurality of gate lines (not shown) and a plurality of data lines (not shown) that are arranged to cross one another. Each of the pixels includes a thin film transistor (TFT) and a pixel electrode 310 that is electrically connected to the TFT. The TFT includes a gate electrode 210, a source electrode 230/drain electrode 240, and an active layer 220 that is formed by patterning a semiconductor layer formed between the gate electrode 210 and the source electrode 230/drain electrode 240 by a gate insulating layer 112. Here, an ohmic contact layer (not shown) may be formed in a region where the active layer 220, the source electrode 230, and the drain electrode 240 contact one another.

A planarization layer 114 is formed on the TFT, and the planarization layer 114 includes a contact hole for exposing a part of the drain electrode 240 of the TFT. The pixel electrode 310 is formed on the planarization layer 114, and is electrically connected to the TFT via the contact hole.

A black matrix 510, a color filter layer 520, an overcoat layer 540, and a common electrode 550 are sequentially formed on the color filter substrate 150. The black matrix 510 blocks light incident from a backlight unit. The color filter layer 520 includes red (R), green (G), and blue (B) color filters 520R, 520G, and 520B, respectively, which are sequentially repeated. The overcoat layer 540 and the common electrode 550 are sequentially formed on the color filter layer 520. Each of the red, green, and blue color filters 520R, 520G, and 520B, respectively, corresponds to one pixel. Here, a height of the color filter layer 520 is less than a height of the black matrix 510.

The black matrix 510 prevents light from leaking and absorbs external light to increase contrast. The black matrix 510 is formed as a light blocking layer in a region to be overlapped with the TFT of the array substrate 110. The black matrix 510 includes a black matrix 510x not having an opening and a black matrix 510y having an opening formed in a center portion thereof. An auxiliary pattern 530 is disposed in the opening.

Double column spacers 560 and 570 are formed on the overcoat layer 540. In the embodiment shown in FIG. 2, although the common electrode 550 is removed from a region where the double column spacers 560 and 570 are formed, the double column spacers 560 and 570 may be alternatively formed on the common electrode 550.

The double column spacers 560 and 570 are formed in a light blocking region where the black matrix 510 is disposed. The double column spacers 560 and 570 include a main column spacer 560 and a sub-column spacer 570 that are formed to have a step height therebetween.

The main column spacer 560 contacts the array substrate 110 and maintains a cell gap. The main column spacer 560 is formed in a region where the black matrix 510x not having an opening is formed.

The sub-column spacer 570 is disposed spaced apart from the array substrate 110 at an ordinary time to prevent a defect that may occur when liquid crystals expand. The sub-column spacer 570 contacts the array substrate 110 when external pressure is applied so as to reduce the external pressure, and thus the sub-column spacer 570 helps the main column spacer 560 maintain the cell gap. The sub-column spacer 570 is formed in a region where the black matrix 510y having an opening is formed.

In other words, in the current embodiment, the main column spacer 560 having a function to maintain the cell gap of the liquid crystal display device 10 and the sub-column spacer 570 reducing the external pressure are formed. Here, the sub-column spacer 570 is spaced apart from the array substrate 110 at a predetermined gap. For this structure, when the sub-column spacer 570 is formed to be shorter than the main column spacer 560, different masks should be used, and thus an additional process is required, thereby extending manufacturing time, increasing manufacturing cost, and deteriorating production yield. Alternatively, a halfton mask may be used, but in this case, manufacturing cost may be increased compared to when a single mask is used.

Accordingly, in the current embodiment, in order to form the step height between the main column spacer 560 and the sub-column spacer 570, the black matrix 510y corresponding to the sub-column spacer 570 is patterned, and the auxiliary pattern 530 is formed in the opening formed by patterning.

The auxiliary pattern 530 is formed at the same time that the blue color filter 520B is formed, and also, the auxiliary pattern 530 may be formed of the same material as that of the blue color filter 520B. Thus, only a structure of a mask used to form the red, green, and blue color filters 520R, 520G, and 520B, respectively, is changed, and only one normal mask may be used when forming the main column spacer 560 and the sub-column spacer 570, thereby reducing additional cost due to use of an additional mask. Also, the auxiliary pattern 530 formed of a color filter material of blue, which is nearly black, may be formed in the opening of the black matrix 510y so as to prevent generation of an abnormal color due to light leakage in the opening in which a part of the black matrix 510y is patterned, and due to penetration/reflection of external light. Also, the red, green, and blue color filters 520R, 520G, and 520B, respectively, are formed in non-opening portions, and thus characteristics of color are not affected.

Meanwhile, although not shown in FIGS. 1 and 2, alignment layers may be formed on the planarization layer 114 of the array substrate 110, the pixel electrode 310, and the common electrode 550 of the color filter substrate 150 so as to align liquid crystals. Here, the alignment layers may be also formed outside of the main column spacer 560 and the sub-column spacer 570.

FIGS. 3 to 6 are schematic cross-sectional views for describing a process of manufacturing the color filter substrate of FIG. 2.

Figure 3:
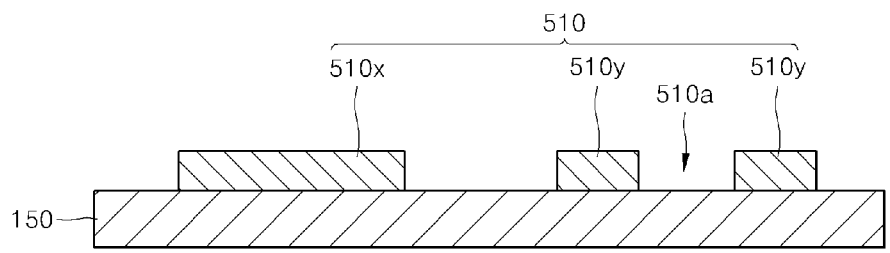
FIGS. 3 to 6 are schematic cross-sectional views for describing a process of manufacturing a color filter substrate of FIG. 2.

Referring to FIG. 3, the black matrix 510 is formed on the color filter substrate 150.

The color filter substrate 150 may be formed of a transparent substrate, for example, a transparent glass material, mainly including $SiO_2$, or a transparent plastic material.

The black matrix 510 may be formed by spraying organic ink or patterning a metal layer using photolithography. The black matrix 510 may be formed of chrome Cr, a chrome oxide (CrOx) layer, or a resin-based organic black matrix (BM). The organic BM may be a colored organic resin, for example, an acryl, epoxy, or polyimide resin including any one of carbon black and black pigments.

A part 510y of the black matrix 510, in a region where the sub-column spacer 570 is to be formed, is patterned to form an opening 510a at the same time that the black matrix 510 is patterned.

Figure 4:
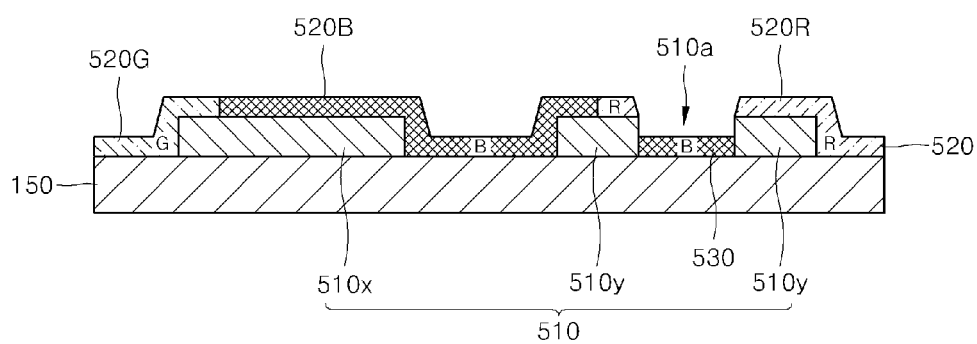

Referring to FIG. 4, the color filter layer 520 is formed on the color filter substrate 150 in which the black matrix 510 is formed. The color filter layer 520 includes the red, green, and blue color filters 520R, 520G, and 520B, respectively, that selectively transmit only light having a predetermined wavelength. The color filter layer 520 may be formed thinner than the black matrix 510.

The red, green, and blue color filters 520R, 520G, and 520B, respectively, may be formed into, for example, stripe type color filters or mosaic type color filters according to a way to arrange the red, green, and blue color filters 520R, 520G, and 520B, respectively.

The color filter layer 520 may be formed by repeatedly performing a process including coating a color photoresist on the color filter substrate 150 and patterning the color photoresist by selectively etching the color photoresist. For example, the red color filter 520R may be formed by coating a red color photoresist and then etching the red color photoresist, the green color filter 520G may be formed by coating a green color photoresist and then etching the green color photoresist, and then the blue color filter 520B may be formed by coating a blue color photoresist and then etching the blue color photoresist. Here, the auxiliary pattern 530 is formed in the opening 510a by using a color photoresist at the same time that blue color filter 520B is formed. The sequence of forming the red, green, and blue color filters 520R, 520G, and 520B, respectively, is not limited. The color photoresist may include a photo-polymerized photosensitive composition, such as a photopolymerization initiator, a monomer or a binder, and an organic pigment expressing color, as main components.

Since the auxiliary pattern 530 is formed at the same time that the blue color filter 520B in the opening 510a is formed, a mask for forming the red, green, and blue color filters 520R, 520G, and 520B, respectively, includes a mask pattern corresponding to the opening 510a.

Figure 5:
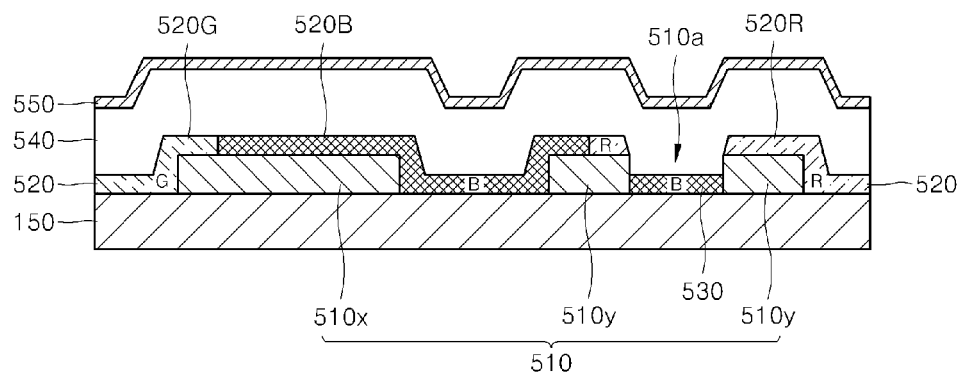

Referring to FIG. 5, the overcoat layer 540 and the transparent electrode 550, which is the common electrode, are formed on the color filter substrate 150, including the black matrix 510 and the color filter layer 520.

The overcoat layer 540 may be formed of a transparent resin having an insulating property so as to planarize the color filter substrate 150 in which the color filter layer 520 is formed, and to prevent elution of pigment ions. In particular, the overcoat layer 540 may be formed of an acryl-based resin or an epoxy-based resin. The height of the overcoat layer 540 in a region where the auxiliary pattern 530 is formed is relatively small A material for forming the transparent electrode 550 may be, for example, indium tin oxide (ITO) or indium zinc oxide (IZO).

Figure 6:
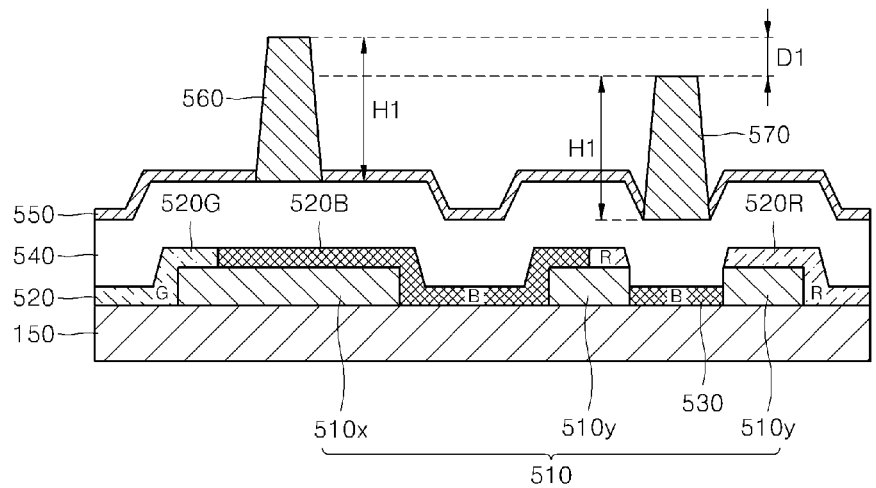

Referring to FIG. 6, the main column spacer 560 and the sub-column spacer 570 having a predetermined height H1 are formed on the color filter substrate 150 in which the transparent electrode 550 is formed.

The main column spacer 560 and the sub-column spacer 570 may be formed by forming a transparent organic layer on the entire surface of the color filter substrate 150 and performing a photolithography process using a single mask.

The main column spacer 560 is formed above the black matrix 510x not having an opening. The sub-column spacer 570 is formed above the black matrix 510y having an opening in which the auxiliary pattern 530 is disposed. Since the height of the auxiliary pattern 530 is less than a height of the black matrix 510y, the height of the sub-column spacer 570 formed above the auxiliary pattern 530 and the height of the main column spacer 560 formed above the black matrix 510x are adjusted. Thus, a step height D1 is formed between the main column spacer 560 and the sub-column spacer 570. In other words, the main column spacer 560 and the sub-column spacer 570, having the same height H1 and formed with the step height D1 therebetween, may be formed using a single mask. Also, the sub-column spacer 570 is formed in a non-opening portion above the auxiliary pattern 530, thereby minimizing light leakage.

In the embodiment shown in FIG. 6, the transparent electrode 550 is removed from lower portions of the main column spacer 560 and the sub-column spacer 570. However, the present invention is not limited thereto, and the main column spacer 560 and the sub-column spacer 570 may be formed on the transparent electrode 550 without removing the transparent electrode 550.

Although not shown in FIG. 6, a rubbing process may be performed by coating an alignment layer (not shown) to align liquid crystal molecules in the color filter substrate 150.

Figure 7:
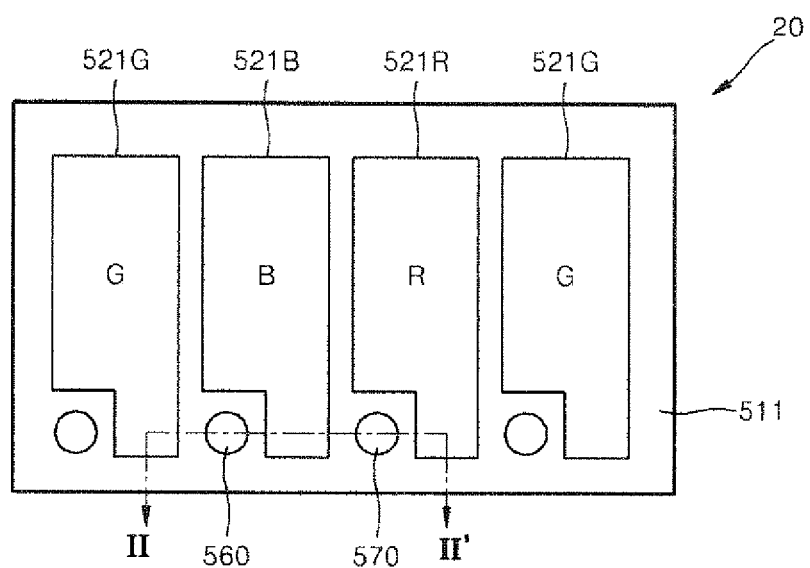
FIG. 7 is a schematic plan view of a liquid crystal display device according to another embodiment of the present invention.
Figure 8:
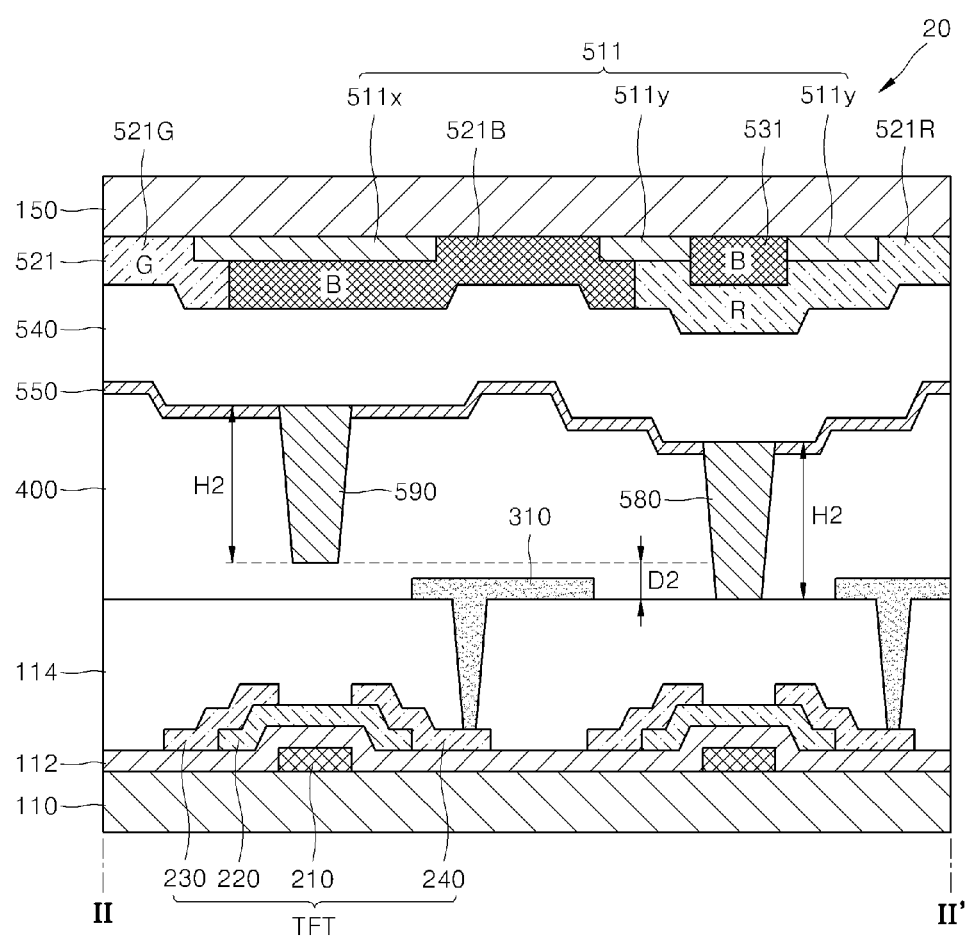
FIG. 8 is a cross-sectional view taken along line II-I' of FIG. 7.
Figure 9:
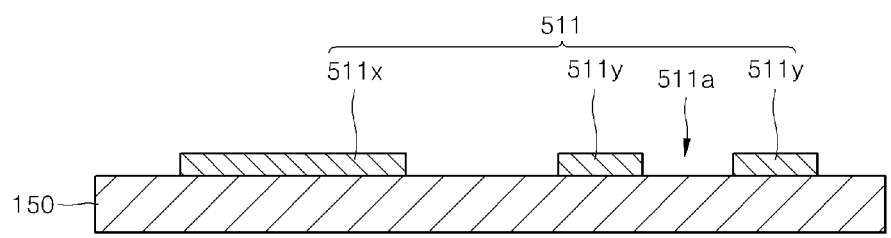
FIGS. 9 to 12 are schematic cross-sectional views for describing a process of manufacturing a color filter substrate of FIG. 8.

FIG. 7 is a schematic plan view of a liquid crystal display device 20 according to another embodiment of the present invention, and FIG. 8 is a cross-sectional view taken along line II-II' of FIG. 7.

Referring to FIGS. 7 and 8, in the liquid crystal display device 20, a height of a color filter layer 521 is greater than a height of a black matrix 511. Thus, the liquid crystal display device 20 shown in FIGS. 7 and 8 is different from the liquid crystal display device 10 shown in FIGS. 1 and 2 in that a sub-column spacer 590 is formed above the black matrix 511x not having an opening and a main column spacer 580 is formed above an auxiliary pattern 531 formed in an opening of the black matrix 511y.

Hereinafter, features of FIGS. 7 and 8 distinguishable from the features of FIGS. 1 and 2 will be described, and the same description will be simply described. For convenience of description, like reference numerals denote like elements.

The liquid crystal display device 20 has a structure in which the array substrate 110 and the color filter substrate 150 are attached to each other. A liquid crystal material is injected between the array substrate 110 and the color filter substrate 150.

Each of the pixels formed on the array substrate 110 includes the TFT and the pixel electrode 310 that is electrically connected to the TFT. The TFT includes the gate electrode 210, the source electrode 230, the drain electrode 240, and the active layer 220 that is formed by patterning a semiconductor layer formed between the gate electrode 210 and the source electrode 230 drain electrode 240 by the gate insulating layer 112. Here, an ohmic contact layer (not shown) may be formed in a region where the active layer 220, the source electrode 230, and the drain electrode 240 contact one another. The pixel electrode 310 is formed on the planarization layer 114, and is electrically connected to the TFT via the contact hole.

A black matrix 511, a color filter layer 521, the overcoat layer 540, and the common electrode 550 are sequentially formed on the color filter substrate 150. The black matrix 511 blocks light incident from a backlight unit. The color filter layer 521 includes red (R), green (G), and blue (B) color filters 521R, 521G, and 521B, respectively, which are sequentially repeated. The overcoat layer 540 and the common electrode 550 are sequentially formed under the color filter layer 521. Each of the red, green, and blue color filters 521R, 521G, and 521B, respectively, corresponds to one pixel. Here, a height of the color filter layer 521 is greater than a height of the black matrix 511.

The black matrix 511 prevents light from leaking and absorbs external light to increase contrast. The black matrix 511 is formed as a light blocking layer in a region to be overlapped with the TFT of the array substrate 110. The black matrix 511 includes a black matrix 511x not having an opening and a black matrix 511y having an opening. An auxiliary pattern 531 is disposed in the opening.

Double column spacers 580 and 590 are formed on the overcoat layer 540. In the embodiment shown in FIG. 8, although the common electrode 550 is removed from a region where the double column spacers 580 and 590 are formed, the double column spacers 580 and 590 may be alternatively formed on the common electrode 550.

The double column spacers 580 and 590 are formed in a light blocking region where the black matrix 511 is disposed. The double column spacers 580 and 590 include a main column spacer 580 and a sub-column spacer 590 that are formed to have a step height therebetween.

The main column spacer 580 contacts the array substrate 110 and maintains a cell gap. The main column spacer 580 is formed in a region where the black matrix 510y having an opening is formed.

The sub-column spacer 590 is disposed spaced apart from the array substrate 110 at an ordinary time to prevent a defect that may occur when liquid crystals expand. The sub-column spacer 590 contacts the array substrate 110 when external pressure is applied so as to reduce the external pressure, and thus the sub-column spacer 590 helps the main column spacer 580 maintain the cell gap. The sub-column spacer 590 is formed in a region where the black matrix 510x not having an opening is formed.

In other words, in the current embodiment, the main column spacer 580 having a function to maintain the cell gap of the liquid crystal display device 20 and the sub-column spacer 590 reducing the external pressure are formed. Here, the sub-column spacer 590 is spaced apart from the array substrate 110 at a predetermined gap.

In the current embodiment, in order to form the step height between the main column spacer 580 and the sub-column spacer 590, the black matrix 511y corresponding to the main column spacer 580 is patterned, and the auxiliary pattern 531 is formed in the opening formed by patterning. The auxiliary pattern 531 is formed at the same time that the blue color filter 521B is formed, and also, the auxiliary pattern 531 may be formed of the same material as that of the blue color filter 521B. Thus, only a structure of a mask used to form the red, green, and blue color filters 520R, 520G, and 520B, respectively, is changed, and only one normal mask may be used when forming the main column spacer 580 and the sub-column spacer 590, thereby reducing additional cost due to use of an additional mask. Also, the auxiliary pattern 531 formed of a color filter of blue, which is nearly black, may be formed in the patterned region of the black matrix 511y so as to prevent generation of an abnormal color due to light leakage in the opening in which a part of the black matrix 511y is patterned, and due to penetration/reflection of external light. Also, the red, green, and blue color filters 521R, 521G, and 521B, respectively, are formed in non-opening portions, and thus characteristics of color are not affected.

Meanwhile, although not shown in FIGS. 7 and 8, alignment layers may be formed on the planarization layer 114 of the array substrate 110, the pixel electrode 310, and the common electrode 550 of the color filter substrate 150 so as to align liquid crystal. Here, the alignment layers may be formed outside of the main column spacer 580 and the sub-column spacer 590.

FIGS. 9 to 12 are schematic cross-sectional views for describing a process of manufacturing the color filter substrate of FIG. 8.

The color filter substrate 150 may be formed of a transparent substrate, for example, a transparent glass material, mainly including $SiO_2$, or a transparent plastic material.

The black matrix 511 may be formed by spraying organic ink or patterning a metal layer using photolithography. The black matrix 511 may be formed of chrome Cr, a chrome oxide (CrOx) layer, or a resin-based organic black matrix (BM). The organic BM may be a colored organic resin, for example, an acryl, epoxy, or polyimide resin including any one of carbon black and black pigments.

A part of the black matrix 511y, in a region where the main column spacer 580 is to be formed, is patterned to form an opening 511a at the same time that the black matrix 511 is patterned.

Figure 10:
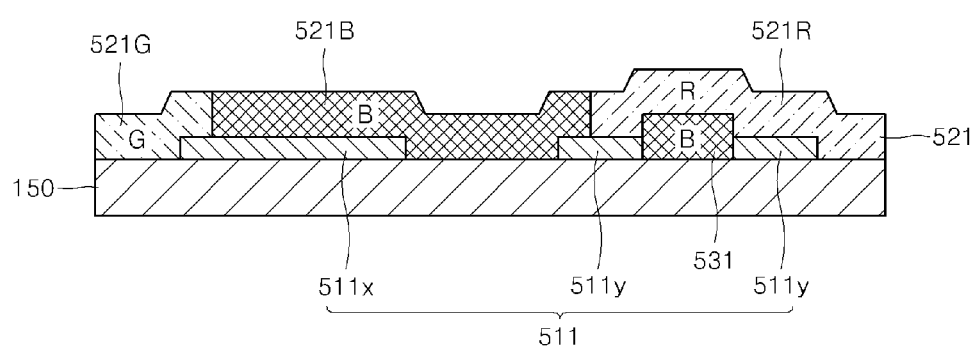

Referring to FIG. 10, the color filter layer 521 is formed on the color filter substrate 150 in which the black matrix 511 is formed. The color filter layer 521 includes the red, green, and blue color filters 521R, 521G, and 521B, respectively, that selectively transmit only light having a predetermined wavelength. The color filter layer 521 may be formed thicker than the black matrix 511.

The red, green, and blue color filters 521R, 5201G, and 521B, respectively, may be formed into, for example, stripe type color filters or mosaic type color filters according to a way to arrange the red, green, and blue color filters 521R, 521G, and 521B, respectively.

The color filter layer 521 may be formed by repeatedly performing a process including coating a color photoresist on the color filter substrate 150 and patterning the color photoresist by selectively etching the color photoresist. For example, the blue color filter 521B may be formed by coating a blue color photoresist and then etching the blue color photoresist, the red color filter 521R may be formed by coating a red color photoresist and then etching the red color photoresist, and then the green color filter 521G may be formed by coating a green color photoresist and then etching the green color photoresist. Here, the auxiliary pattern 531 is formed in the opening 511a by using a color photoresist at the same time that the blue color filter 521B is formed. In the current embodiment, the auxiliary pattern 531 is formed of a blue color photoresist, and the red color filter 521R or the green color filter 521G is formed on the auxiliary pattern 531. Accordingly, after forming the blue color filter 521B, the sequence of forming the red color filter 521R and the green color filter 521G is not limited. The color photoresist may include a photo-polymerized photosensitive composition, such as a photopolymerization initiator, a monomer or a binder, and an organic pigment expressing color as main components.

Since the auxiliary pattern 531 is formed at the same time that the blue color filter 521B is formed, a mask for forming the blue color filter 521B includes a mask pattern corresponding to the opening 511a.

Figure 11:
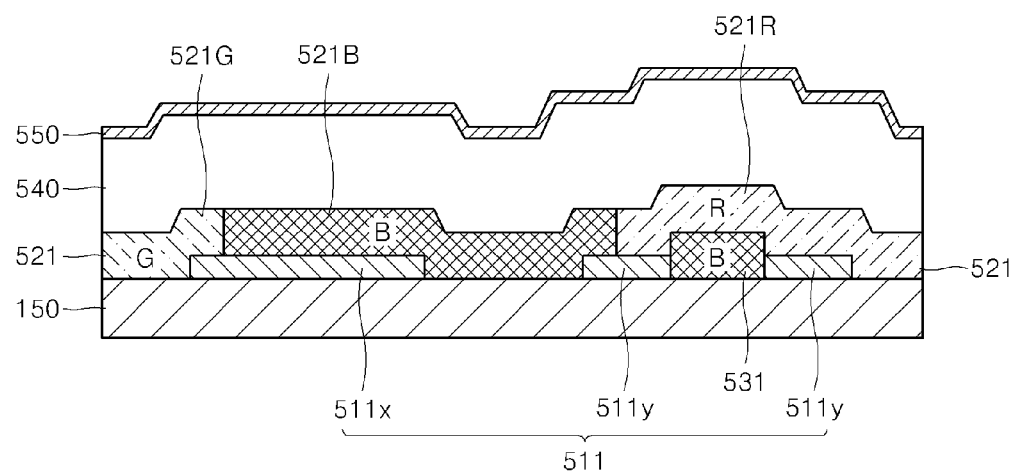

Referring to FIG. 11, the overcoat layer 540 and the transparent electrode 550, which is the common electrode 550, are formed on the color filter substrate 150, including the black matrix 511 and the color filter layer 521.

The overcoat layer 540 may be formed of a transparent resin having an insulating property so as to planarize the color filter substrate 150 in which the color filter layer 521 is formed, and to prevent elution of pigment ions. In particular, the overcoat layer 540 may be formed of an acryl-based resin or an epoxy-based resin. The height of the overcoat layer 540 in a region where the auxiliary pattern 531 is formed is relatively great.

A material for forming the transparent electrode 550 may be, for example, ITO or IZO.

Figure 12:
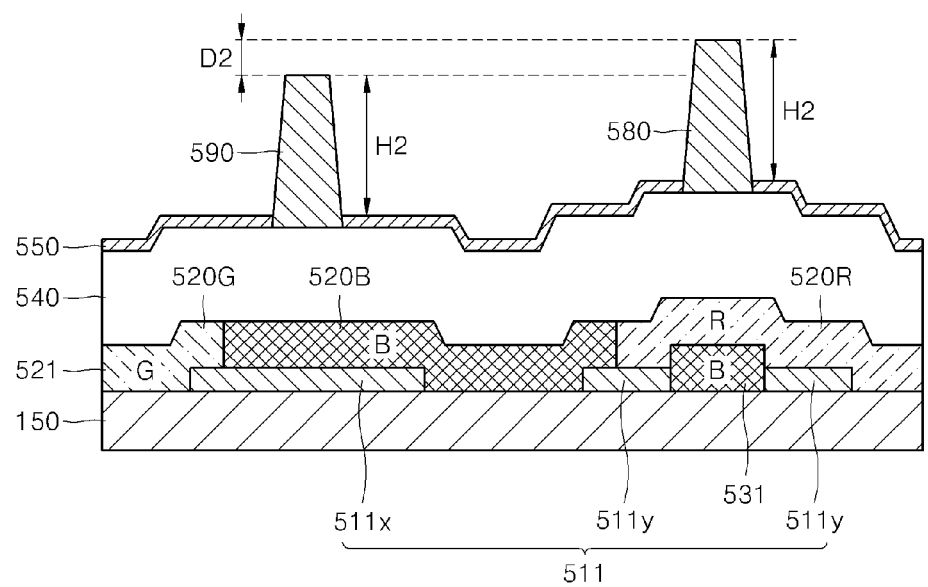

Referring to FIG. 12, the main column spacer 580 and the sub-column spacer 590 having a predetermined height H2 are formed on the color filter substrate 150 in which the transparent electrode 550 is formed.

The main column spacer 580 and the sub-column spacer 590 may be formed by forming a transparent organic layer on the entire surface of the color filter substrate 150 and performing a photolithography process using a single mask.

The main column spacer 580 is formed above the black matrix 511y having an opening in which the auxiliary pattern 531 is disposed. The sub-column spacer 590 is formed above the black matrix 511x not having an opening. Since the height of the auxiliary pattern 531 is greater than a height of the black matrix 511, the height of the main column spacer 580 formed above the auxiliary pattern 531 and the height of the sub-column spacer 590 formed above the black matrix 511y are adjusted. Thus, a step height D2 is formed between the main column spacer 580 and the sub-column spacer 590. In other words, the main column spacer 580 and the sub-column spacer 590, having the same height H2 and formed with the step height D2 therebetween, may be formed using a single mask. Also, the main column spacer 580 is formed in a non-opening portion above the auxiliary pattern 531, thereby minimizing light leakage.

In the embodiment shown in FIG. 12, the transparent electrode 550 is removed from lower portions of the main column spacer 580 and the sub-column spacer 590. However, the present invention is not limited thereto, and the main column spacer 580 and the sub-column spacer 590 may be formed on the transparent electrode 550 without removing the transparent electrode 550.

Although not shown in FIG. 12, a rubbing process may be performed by coating an alignment layer (not shown) to align liquid crystal molecules in the color filter substrate 150.

In the present invention, a column spacer may perform a dual function without performing an additional process, and thus a liquid crystal display device, causing maintenance of a cell gap and not causing a touch error due to reduction in external pressure, may be provided.

In the above-described embodiments of the present invention, although a column spacer having a cross-section of a quadrilateral shape has been described, the present invention is not limited thereto. That is, the present invention is applied regardless of the shape of the column spacer.

Also, in the above-described embodiments of the present invention, although an auxiliary pattern is formed by patterning a black matrix of a red pixel, the present invention is not limited thereto. That is, the auxiliary pattern may be formed in any one of red, green, and blue pixels, and the auxiliary pattern may be formed of a material that is the same as that of a blue color filter.

In the present invention, reliability of maintenance of a cell gap may be improved by forming double column spacers. Also, in the present invention, since the double column spacers are formed by using a single column spacer mask, the number of masks may be reduced, thereby reducing manufacturing cost.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A color filter substrate, comprising:
   a first black matrix not having an opening and a second black matrix having two separate and distinct portions separated by an opening, the first black matrix and the second black matrix being formed on a substrate;
   an auxiliary pattern disposed in the opening between the two separate and distinct portions of the second black matrix;
   a color filter covering the first and second black matrixes, and formed in each of a plurality of pixels;
   an overcoat layer formed on the color filter; and
   a first column spacer formed on the overcoat layer and corresponding to the first black matrix, and a second column spacer formed above the auxiliary pattern and corresponding to the second black matrix.

2. The color filter substrate of claim 1, the auxiliary pattern being a part of the color filter.

3. The color filter substrate of claim 2, the color filter forming the auxiliary pattern and being a blue color filter.

4. The color filter substrate of claim 1, heights of the first and second black matrixes being greater than a height of the auxiliary pattern.

5. The color filter substrate of claim 1, heights of the first and second black matrixes being less than a height of the auxiliary pattern.

6. The color filter substrate of claim 1, the first column spacer and the second column spacer having a same height, and a step height being formed between the first column spacer and the second column spacer.

7. The color filter substrate of claim 1, further comprising a common electrode formed on the overcoat layer.

8. A liquid crystal display device, comprising:
   a first substrate;
   a first black matrix formed on the first substrate and not having an opening;
   a second black matrix formed on the first substrate and having two separate and distinct portions separated by an opening;
   an auxiliary pattern disposed in the opening between the two separate and distinct portions of the second black matrix;
   a color filter covering the first and second black matrixes and formed in each of a plurality of pixels;
   an overcoat layer formed on the color filter;
   a first column spacer formed on the overcoat layer and corresponding to the first black matrix;
   a second column spacer formed above the auxiliary pattern and corresponding to the second black matrix;
   a second substrate;
   a thin film transistor (TFT) formed in a light blocking region on the second substrate; and
   a pixel electrode electrically connected to the TFT.

9. The liquid crystal display device of claim 8, the auxiliary pattern being formed as a part of the color filter.

10. The liquid crystal display device of claim 9, the color filter for forming the auxiliary pattern being a blue color filter.

11. The liquid crystal display device of claim 8, heights of the first and second black matrixes being greater than a height of the auxiliary pattern.

12. The liquid crystal display device of claim 8, heights of the first and second black matrixes being less than a height of the auxiliary pattern.

13. The liquid crystal display device of claim 9, the first column spacer and the second column spacer having a same height, and a step height being formed between the first column spacer and the second column spacer.

14. The liquid crystal display device of claim 8, further comprising a common electrode formed on the overcoat layer.

15. A method of manufacturing a color filter substrate, the method comprising the steps of:
   forming a first black matrix not having an opening and a second black matrix having two separate and distinct portions separated by an opening;
   forming a color filter on the first black matrix and the second black matrix;
   disposing an auxiliary pattern in the opening between the two separate and distinct portions of the second black matrix;
   forming an overcoat layer on the color filter and the auxiliary pattern;
   forming a first column spacer in a region where the first black matrix is formed on the overcoat layer; and
   forming a second column spacer in a region where the second black matrix is formed on the overcoat layer.

16. The method of claim 15, the auxiliary pattern being formed as a part of the color filter.

17. The method of claim 16, the color filter for forming the auxiliary pattern being a blue color filter.

18. The method of claim 15, heights of the first and second black matrixes being greater than a height of the auxiliary pattern.

19. The method of claim 15, heights of the first and second black matrixes being less than a height of the auxiliary pattern.

20. The method of claim 15, further comprising the step of forming a common electrode on the overcoat layer.

* * * * *